(12) United States Patent
Jurisch et al.

(10) Patent No.: US 7,523,015 B2
(45) Date of Patent: Apr. 21, 2009

(54) FIELD DEVICE

(75) Inventors: Andreas Jurisch, Schwante (DE); Volker Wenzel, Hohen Neuendorf (DE)

(73) Assignee: Siemens Aktiengesellschaft, Munich (DE)

( * ) Notice: Subject to any disclaimer, the term of this patent is extended or adjusted under 35 U.S.C. 154(b) by 97 days.

(21) Appl. No.: 11/661,343

(22) PCT Filed: Jun. 22, 2005

(86) PCT No.: PCT/DE2005/001128

§ 371 (c)(1), (2), (4) Date: Feb. 27, 2007

(87) PCT Pub. No.: WO2006/136122

PCT Pub. Date: Dec. 28, 2006

(65) Prior Publication Data

US 2008/0040073 A1    Feb. 14, 2008

(51) Int. Cl.
*G06F 15/00* (2006.01)
(52) U.S. Cl. ...................... 702/182; 324/512
(58) Field of Classification Search ......... 702/182–185, 702/188; 324/512
See application file for complete search history.

(56) References Cited

U.S. PATENT DOCUMENTS 5,572,438 A * 11/1996 Ehlers et al. ............... 700/295

2006/0127183 A1 * 6/2006 Bishop, Jr. ............... 405/37

FOREIGN PATENT DOCUMENTS

DE    101 58 745 A1    6/2003

* cited by examiner

*Primary Examiner*—Edward Raymond
(74) *Attorney, Agent, or Firm*—Laurence A. Greenberg; Werner H. Stemer; Ralph E. Locher

(57) ABSTRACT

A field device for monitoring an operating state of an electrical engineering installation, in particular a transformer substation or a switching substation, having an evaluation device, which evaluates input signals, which are present on the input side and relate to the electrical engineering installation, on the basis of predetermined criteria and, on the output side, generates an output signal, which characterizes the respective evaluation result. An identification can be input to the evaluation device which specifies the hierarchical level to which the evaluation device is assigned. The evaluation device is designed such that, after a connection to a data transmission network, it automatically produces a data link with all other evaluation devices connected thereto or with all other evaluation devices connected thereto of a predetermined type which belong to a directly lower-order or a directly higher-order hierarchical level. The output signals of hierarchically lower-order evaluation devices are processed as input signals and dedicated output signals are passed on to hierarchically higher-order evaluation devices.

18 Claims, 2 Drawing Sheets

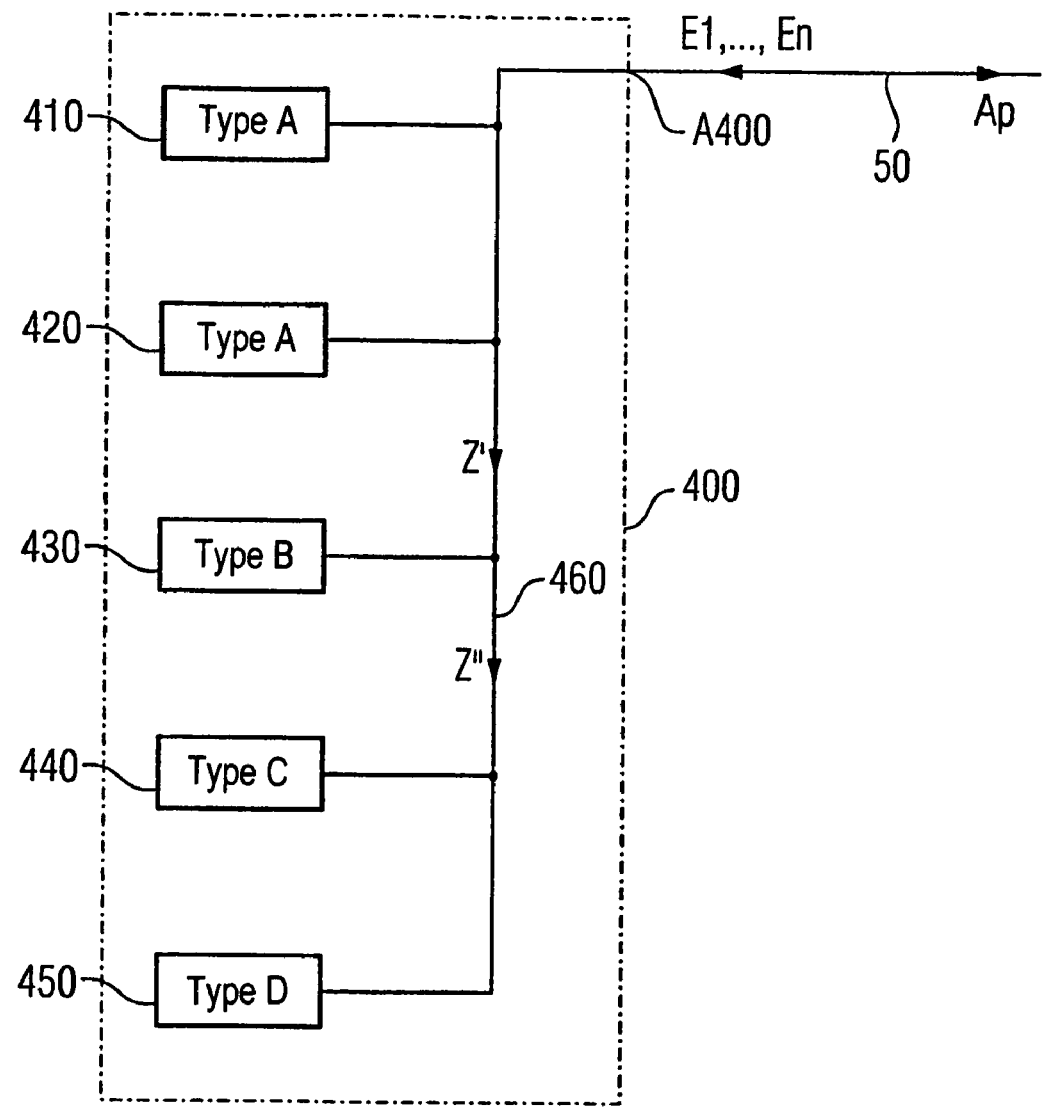

FIELD DEVICE

BACKGROUND OF THE INVENTION

Field of the Invention

The invention relates to a field device for monitoring an operating state of an electrical engineering installation, in particular a transformer substation or a switching substation. The field device has an evaluation device, which evaluates input signals that are present on the input side and relate to the electrical engineering installation, on the basis of predetermined criteria. The device generates an output signal that characterizes the respective evaluation result.

Such a field device is marketed, for example, by Siemens AG under the product name "SIPROTEC".

A known focal point in the process management of electrical engineering installations, in the case of a suddenly occurring unusual operating state, to identify rapidly and clearly which state has occurred and which measures need to be taken without delay. For example, the following faults may occur:

Repeated excitations of an outgoing line result owing to a distance protection device of the electrical engineering installation. The ground loop is affected by this. In such a case, the maintenance personnel of the electrical engineering installation should attempt, as quickly as possible, to isolate the faulty line because an object in the vicinity of the line (tree, motor vehicle etc.) could possibly be at risk.

If, in the event of a fault, there is no ground loop involved, the necessary response is different: in this case, there may be a long-wave cable oscillation, with the result that the line should remain connected owing to the desired network stability.

Depending on the fault case, different measures therefore need to be taken; the knowledge of which measure is the suitable one in the individual case needs to be filtered out from a very large amount of available information. The communication standards used nowadays make available, technically, a very high data stream and therefore a very large quantity of data, which needs to be evaluated in control centers, for example so-called control rooms. Owing to the large number of data flowing into the control centers, there is the risk of the maintenance personnel handling it incorrectly.

In order to avoid the problem of too much data flooding into the control centers, the currently conventional field devices and also the central control-engineering devices of the control centers offer "information filters" with which information compression or information filtering is carried out. This information compression reduces the items of information to be evaluated by the maintenance personnel in the control center or in the control room and therefore reduces the probability of them being handled incorrectly.

The field devices available today unfortunately have the disadvantage that it is necessary to establish as early as in the design phase of an electrical engineering installation specifically in which way the field devices of the electrical engineering installation should carry out information compression and to what the respectively information-compressed data need to be passed on. With field devices to date it has therefore been necessary to define the interaction of the individual components of the electrical engineering installation in detail in advance. Apart from the fact that such a design process is very involved and results in high costs, alterations to the electrical engineering installation can be carried out subsequently only with a high level of complexity, since it is virtually necessary to "redesign" the complete installation.

SUMMARY OF THE INVENTION

The invention is based on the object of developing a field device of the type mentioned at the outset such that it makes it possible to construct electrical engineering installations with as low design costs as possible. In addition, a subsequent alteration to the configuration or the topology of the electrical engineering installation is possible in a manner which is as simple and cost-effective as possible.

This object is achieved on the basis of a field device of the type specified at the outset according to the invention by the characterizing features of claim 1. Advantageous configurations of the field device according to the invention are specified in the dependent claims.

Accordingly, the invention provides that an identification can be assigned to an evaluation device of the field device which specifies the hierarchical level to which the evaluation device is assigned. The evaluation device is also designed such that, after a connection to a data transmission network, it automatically produces a data link with other evaluation devices connected thereto—whether this be in fact with all evaluation devices or with all evaluation devices of a predetermined type—if these evaluation devices belong to directly lower-order or directly higher-order hierarchical levels. The evaluation device then further-processes output signals (for example output data signals) of hierarchically lower-order evaluation devices as input signals (for example input data signals) and transmits its dedicated output data signals to hierarchically higher-order evaluation devices.

One substantial advantage of the field device according to the invention can be regarded as the fact that this field device makes it possible for information items to be precompressed without the specific processing sequence of the data compression needing to be defined or established as early as in the design phase of the electrical engineering installation. This advantage is achieved by virtue of the fact that the evaluation device of the field device is automatically "capable of being interlinked"; this means that the evaluation device is capable, after a connection to a data transmission network, of automatically making contact with other evaluation devices and of automatically creating a hierarchically organized structure for data evaluation and data compression with these evaluation devices. In order to make it possible to create the structure, the only precondition is that an identification is input to each evaluation device which establishes the hierarchical level of the respective evaluation device. In contrast to previously known field devices, in which it is necessary to establish quite specifically, as early as when the electrical engineering installation is designed, with which other evaluation devices data are intended to be interchanged—whether it be with evaluation devices within one and the same field device or with "external" evaluation devices of other field devices, it is not necessary with the field device according to the invention for each evaluation device to be established specifically; this is because, on the basis of the input hierarchical level, the evaluation device itself determines which "partners" are the "correct ones" for information compression. In other words, the evaluation device of the field device according to the invention organizes the formation of its data links and therefore the manner in which the electrical engineering installation functions and the sequence of the data compression automatically by, depending on its respective hierarchical identification, determining the corresponding evaluation devices of directly higher-order and lower-order hierarchical levels, making contact with these evaluation devices and then cooperating with them. Establishing the partner evaluation devices in this case takes place only when the field device is brought into operation or after a connection to a data transmission network; in the design phase of the electrical engineering installation, it is not necessary to establish specific device or data links for the evaluation devices—in contrast to the previously known field devices. In summary, according to the invention only one "level" within the later hierarchy is allocated to the evaluation device of the field device; the actual data interlinking of the evaluation devices with one another resulting therefrom establishes this level itself.

A further substantial advantage of the field device according to the invention can be considered to be the fact that it can itself automatically respond to a change in the topology of the electrical engineering installation. If, for example, new field devices are added to an existing electrical engineering installation, in the case of field devices of the previously known type all required new data links need to be established by the maintenance personnel "by hand". In contrast to this, the field devices according to the invention automatically identify the change in the topology of the electrical engineering installation themselves since, when an additional field device is connected, a link is automatically set up with higher-order or lower-order field devices; the structure of the data links is therefore matched automatically to the new installation topology.

The described interlinking of the evaluation devices can take place internally within the device and/or externally from the device: if the field device contains "device-internally" for example two or more evaluation devices, which are connected to one another via a field-device-internal data transmission network, it is regarded as being advantageous if the at least two evaluation devices, in each case after activation of the field-device-internal data transmission network, automatically produce a data link with hierarchically directly lower-order and/or directly higher-order evaluation devices of the "dedicated" field device.

If the evaluation device is connected to a connection for an external data transmission network, by means of which the field device can be connected to other, external field devices, the evaluation device of the field device is preferably designed such that, after connection to the external data transmission network, it automatically produces in each case a data link with all other evaluation devices connected thereto of other field devices or with other evaluation devices connected thereto of a predetermined type if these evaluation devices belong to a directly lower-order or a directly higher-order hierarchical level.

Preferably, the evaluation device has a communication device, which, after a connection to an internal or external data transmission network, automatically produces a data link with communication devices of other evaluation devices if these communication devices belong to a directly lower-order or a directly higher-order hierarchical level.

An analysis device is preferably connected to the communication device and further-processes output data signals of analysis devices of hierarchically lower-order evaluation devices as input data signals and passes dedicated output data signals on to analysis devices of hierarchically higher-order evaluation devices by means of the communication device assigned to it.

Preferably, the analysis device is equipped with a trigger filter and a case indication filter, which is arranged downstream of the trigger filter and generates the output data signals of the evaluation device, the case indication filter being activated only when the trigger filter has responded. The evaluation device preferably passes dedicated output data signals on to hierarchically higher-order evaluation devices only when the case indication filter has been activated.

The trigger filter and/or the case indication filter are advantageously supplemented in dynamic fashion, in order to make it possible to adapt them to changing external circumstances.

During the further-processing of the input data signals of hierarchically lower-order evaluation devices, information compression preferably takes place such that the output data signals have a higher information density than the input data signals. For example, the information compression takes place by information components of the input data signals which do not have any significance or have a subordinate significance for the characterization of the operating state of the electrical engineering installation being omitted.

The evaluation device preferably uses data links in accordance with the standard IEC61850. For example, the analysis device of the evaluation device compares, as input data signals, the instantaneous states stored in the object directory of the IEC61850 standard with state masks or result lists, which are stored in the field device in a manner which is specific to the field devices or independent of the field devices.

In order to determine the installation topology, the evaluation device preferably evaluates output data signals of a hierarchically lower-order evaluation device with respect to the assignment of the lower-order evaluation device in terms of circuitry within the electrical engineering installation. Advantageously, the evaluation device in this case uses installation topology data, which are stored in accordance with the IEC61850 standard, of the electrical engineering installation for the topology assignment of the lower-order evaluation device.

In addition, the invention is considered to be an electrical engineering installation (an electrical engineering system) having at least two field devices connected by a data transmission network.

In order to achieve as low design costs as possible when designing such an installation and in order to make it possible to subsequently change the configuration or the topology of the electrical engineering installation in a manner which is as simple and cost-effective as possible, the invention proposes using field devices of the described type according to the invention. These field devices are designed such that, after a connection to a data transmission network, they automatically produce a data link with all other field devices connected thereto which belong to a directly lower-order or a directly higher-order hierarchical level. Then, they further-process the output data signals of hierarchically lower-order field devices as input data signals and pass dedicated output data signals on to hierarchically higher-order field devices.

The invention will be explained below with reference to exemplary embodiments. In the drawing:

BRIEF DESCRIPTION OF THE DRAWINGS

FIG. 3 shows a further exemplary embodiment of a field device according to the invention.

DESCRIPTION OF THE PREFERRED EMBODIMENTS

Figure 1:
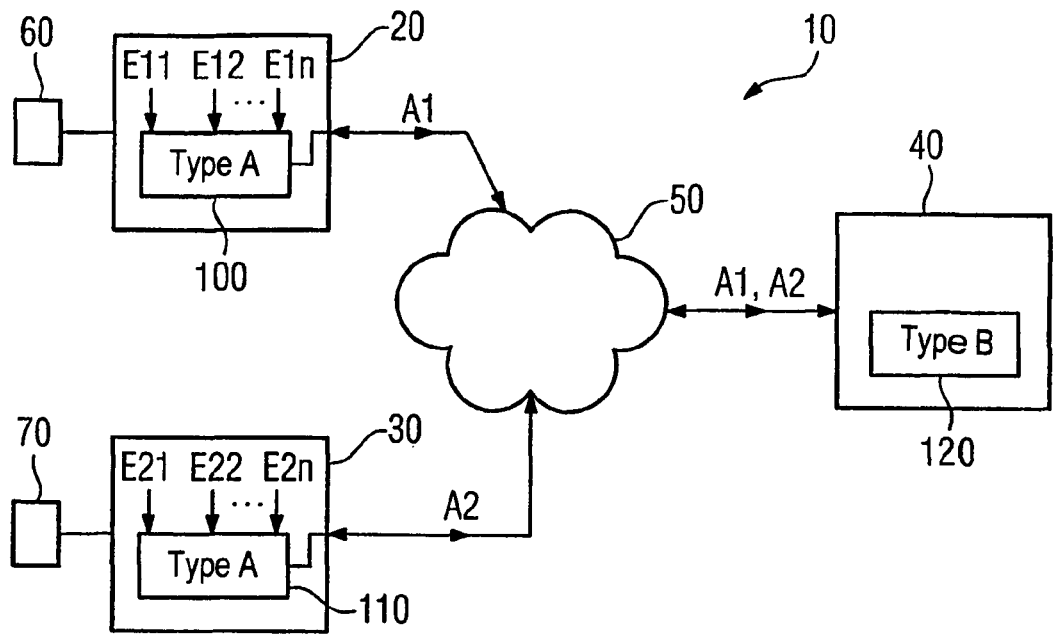
FIG. 1 shows an exemplary embodiment of an electrical installation according to the invention having three field devices according to the invention.

FIG. 1 shows an electrical engineering installation 10, which has three field devices 20, 30 and 40, which are connected to one another via a data transmission network 50.

The field device 20 is a distance protection device, which is connected on the input side to measuring transducers 60. The field device 30 is a differential protection device, upstream of which, on the input side, measuring transducers 70 are connected. The field device 40 is a station central controller, which has a higher hierarchical level than the two field devices 20 and 30.

As can be seen in FIG. 1, the three field devices 20, 30 and 40 are each equipped with an evaluation device 100, 110 and 120. The two evaluation devices 100 and 110 belong to a first hierarchical level and accordingly have a hierarchical identification "type A". The evaluation device 120 of the station central controller 40 belongs to a directly higher-order hierarchical level; accordingly, the hierarchical identification "type B" is assigned to the evaluation device 120 of the station central controller 40.

The electrical engineering installation shown in FIG. 1 is operated as follows:

The evaluation device 100 of the distance protection device 20 and the evaluation device 110 of the differential protection device 30 in each case evaluate their input data signals E11, E12, . . . , E1n and, respectively, E21, E22, . . . , E2n, which are present on the input side. The input data signals may originate, for example, from the upstream measuring transducers 60 or 70 or from other field devices (not illustrated in FIG. 1) which belong to a lower-order hierarchical level.

The evaluation devices 100 and 110 investigate the input data signals E11 to E1n and, respectively, E21 to E2n, which are present on the input side, for the presence of predetermined states stored in the evaluation device. As soon as a correspondingly stored state is discovered, the evaluation devices 100 and 110 generate corresponding output data signals A1 and A2, respectively, and transmit these via the data transmission network 50 to the hierarchically higher-order evaluation device 120 of the station central controller 40.

In the station central controller 40, the signals A1 and A2, which are present on the input side and thus represent input data signals of the evaluation device 120, are evaluated once more. Such an evaluation can take place, for example, by the data signals A1 and A2 which characterize the instantaneous states of the electrical engineering installation 10 being compared with stored state masks; if such a comparison is successful, it is concluded that a predetermined state, for example a fault state, is present.

The evaluation devices 100, 110 and 120 are designed such that, after connection to the data transmission network 50, they automatically search for other evaluation devices which are connected to the data transmission network 50. Such a "partner search" can be carried out in a very simple manner, for example by means of an ETHERNET IP broadcast, as described in RFC 1180 (published, inter alia, on the Internet at http://www.ietf.org/rfc/rfc1180.txthttp://www.faqs.org/rfcs/rfc1180.html), because this standard allows the devices which are connected to the data transmission network 50 to start search requests for partners whose existence is at first not definitely fixed. For this purpose, the evaluation devices send corresponding broadcast signals for the link search.

In the context of the search request, each of the evaluation devices 100, 110 and 120 attempts to produce in each case a data link to all other evaluation devices which are at a directly higher-order or lower-order level. In a specific case, the evaluation device 100 will therefore establish that the evaluation device 120 which is assigned to the "type B" hierarchy and is therefore at a higher-order level is present in the station central controller 40. Accordingly, the evaluation device 100 will attempt to produce a data link with the evaluation device 120.

The evaluation device 110 functions in a corresponding manner and will therefore attempt likewise to enter into a data link with the evaluation device 120.

Since the two evaluation devices 100 and 110 belong to the same hierarchical level, the two evaluation devices 100 and 110 will, on the other hand, not attempt to make direct contact with one another; this is because, in the case of the electrical engineering installation shown in FIG. 1, contact is made exclusively in the direction of a higher or lower hierarchical level.

Figure 2:
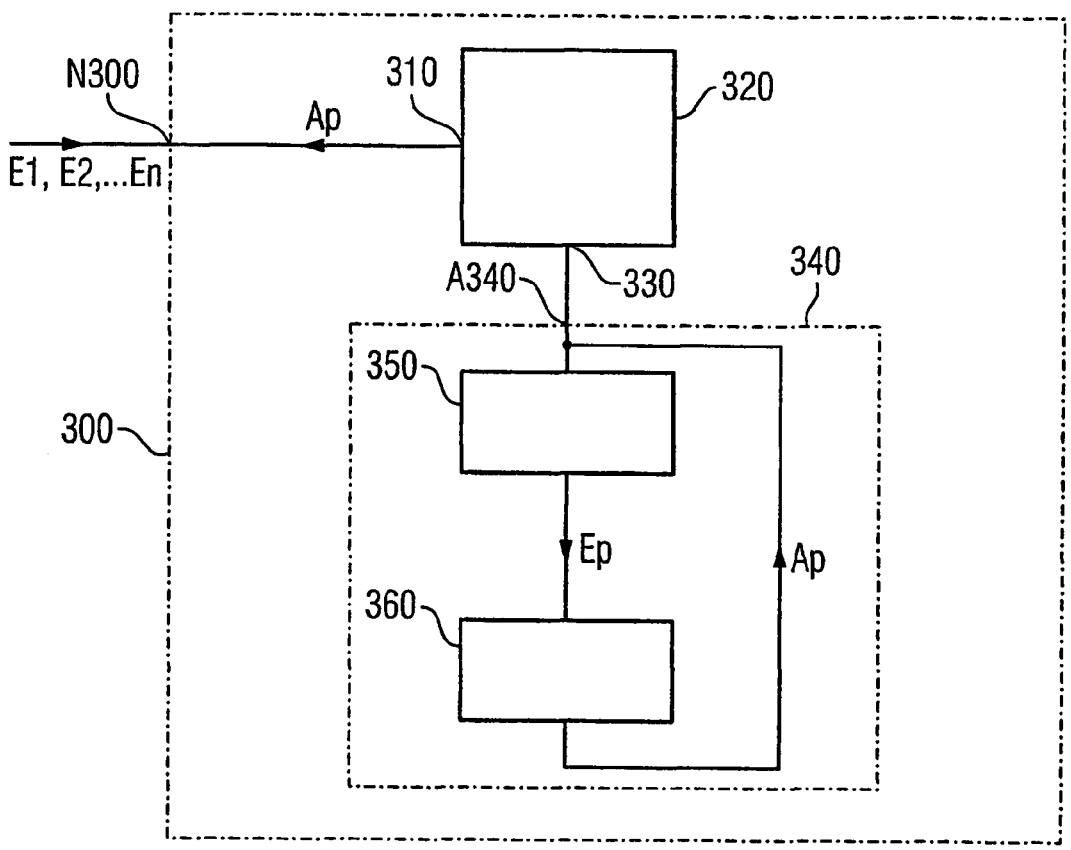
FIG. 2 shows an exemplary embodiment of an evaluation device, which is in each case suitable for the three devices of the arrangement shown in FIG. 1.

The manner in which the evaluation devices 100, 110 and 120 function will be explained in more detail below with reference to FIG. 2. FIG. 2 illustrates an exemplary embodiment of an evaluation device which can be used in the distance protection device 20, in the differential protection device 30 or in the station central controller 40 shown in FIG. 1. The exemplary embodiment of the evaluation device is identified by the reference symbol 300 in FIG. 2.

In order to connect it to the data transmission network 50 in FIG. 1, the evaluation device 300 has a network connection N300, which is connected on the input side to a connection 310 of a communication device 320. The communication device 320 is connected to an analysis device 340 via a further connection 330. The analysis device 340 has a trigger filter 350, which is connected on the input side to the further connection 330 of the communication device 320. On the output side, a case indication filter 360 is arranged downstream of the trigger filter 350 and is connected on the output side to the further connection 330 of the communication device 320.

The evaluation device 300 shown in FIG. 2 functions as follows:

As soon as input data signals E1, E2, . . . En—for example the output data signals A1 and A2 of the field devices 20 and 30 shown in FIG. 1—are present at the network connection N300 of the evaluation device 300, these input data signals are received via the communication device 320 and passed on to the analysis device 340. The trigger filter 350 of the analysis device 340 compares the input data signals E1 to En, which represent, for example, instantaneous states of the IEC61850 object directory, with predefined state masks, which are stored in the trigger filter 350 in a manner which is dependent on the devices or independent of the devices. The expert knowledge, so to speak, which is used for evaluating the input data signals present on the input side, is concentrated in the state masks of the trigger filter 350.

If a correspondence between the input data signals E1 to En, on the one hand, and the state masks, on the other hand, is established in the trigger filter 350, the corresponding input data signals—in the example shown in FIG. 2, for example, the input data signal Ep—are passed on to the case indication filter 360. In the case indication filter 360, it is established whether a fault case, or what kind of fault case, corresponds to the input data signal Ep present on the input side. Depending on the state identified in the case indication filter 360, an output data signal Ap is generated on the output side which denotes the state identified in the case indication filter 360. In this case, the output data signal Ap is information-compressed in comparison with the input data signal Ep: this means that the output data signal Ap identifies the respectively recognized fault state with a smaller quantity of data than the input data signal Ep.

The output data signal Ap generated by the case indication filter 360 is passed to the further connection 330 of the communication device 320 via the connection A340 of the analysis device 340 and, from there, to the network connection N300 or to the data transmission network 50 shown in FIG. 1.

By way of summary, the analysis device 340 therefore has the function of evaluating input data signals E1 to En present on the input side, compressing them in terms of their information content and generating output data signals Ap which are information-compressed on the output side. The output data signals are transmitted to the data transmission network 50 and, from this, again passed on to hierarchically higher-order evaluation devices.

In the exemplary embodiment shown in FIG. 2, the analysis device 340 has only one single trigger filter 350 and one single case indication filter 360. Alternatively, the analysis device 340 may also have a plurality of such trigger filters and case indication filters, which are cascaded or arranged next to one another hierarchically in a row and are therefore capable of identifying even very complex operations or states. The hierarchical arrangement or interlinking of this large number of filters within the analysis device 340 can be fixedly predetermined, for example; alternatively, it is also possible to merely input a hierarchical identification to the respective filters such that the filters themselves are interlinked, as a function of their respective hierarchical identification, within the analysis device 340, as is also carried out in analogous fashion by the evaluation devices 100, 110 and 120 in the electrical engineering installation 10 shown in FIG. 1.

The trigger filter 350 and the case indication filter 360 of the analysis device 340 may be permanently programmed filters or filters which can be supplemented in dynamic fashion; in the latter case, the filter properties can change or be supplemented in dynamic fashion in order to adapt or improve the filtering result.

The evaluation device 300 shown in FIG. 2 can reduce the flood of information present on the input side in the form of the input data signals E1 to En, for example, by using the analysis device 340 to classify and sort the input data signals on the basis of event types—such as network errors, connection operation, voltage dip, harmonics-containing voltage interference etc., for example. The analysis device 340 can then summarize the information items detected in this manner and therefore generate "compressed" output data signals Ap, which exclusively reproduce the result of the previously carried out filtering operation. In this case, for example, installation-specific identifications are also provided along with the output data signals Ap using the standard IEC61850, and these identifications make it possible to identify the installation parts of the electrical engineering installation 10 shown in FIG. 1 affected by the respective result by means of the hierarchically higher-order field device (for example station central controller or central control engineering device. In order to simplify such an identification of the affected installation parts, the installation data of the electrical engineering installation are preferably defined using the object structure of the standard IEC61850 and made available to the field devices in a corresponding fashion.

FIG. 3 shows a further exemplary embodiment of a field device according to the invention. This field device 400 has, in contrast to the field devices shown in FIG. 1, five evaluation devices 410, 420, 430, 440 and 450. These evaluation devices are connected to one another via a field-device-internal data transmission network 460.

The five evaluation devices, in each case after activation of the field-device-internal data transmission network 460, automatically produce data links, to be precise in each case with hierarchically directly lower-order and directly higher-order evaluation devices. As a result, the evaluation devices 410 and 420 (in each case "type A") are connected to the higher-order evaluation device 430 ("type B"), and vice versa, the evaluation device 430 with the higher-order evaluation device 440 ("type C"), and vice versa, and the evaluation device 440 with the higher-order evaluation device 450 ("type D"), and vice versa.

Input signals E1 to En present on the input side therefore first arrive at the two evaluation devices 410 and 420 and are data-compressed there to form intermediate signals Z'. The intermediate signals Z' arrive at the higher-order evaluation device 430, which carries out further filtering and forms compressed intermediate signals Z''. These are in each case "information-compressed" further still in the evaluation devices 440 and 450 and arrive as output signals Ap at a connection A400 for connecting the field device 400 to an external data transmission network 50.

LIST OF REFERENCE SYMBOLS

10 Electrical engineering installation
20 Distance protection device
30 Differential protection device
40 Station central controller
50 Data transmission network
60 Measuring transducer
70 Measuring transducer
100 Evaluation device
110 Evaluation device
120 Evaluation device
300 Evaluation device
310 Connection
320 Communication device
330 Further connection
340 Analysis device
A340 Connection
350 Trigger filter
360 Case indication filter
400 Field device
A400 Connection for data transmission network
410-450 Evaluation devices
460 Device-internal data transmission network
E1-En Input data signals
E11-E1n Input data signals
E2-E2n Input data signals
Ap Output data signals

We claim:

1. A field device for monitoring an operating state of an electrical engineering installation, the field device comprising:

an evaluation device for evaluating input signals, present on an input side and relating to the electrical engineering installation, on a basis of predetermined criteria, and generating an output signal, on an output side, characterizing a respective evaluation result;

said evaluation device being configured to receive an identification specifying a hierarchical level to which the evaluation device is assigned;

said evaluation device being configured, upon being connected to a data transmission network, to automatically set up a data link with all other evaluation devices connected thereto or with all other evaluation devices connected thereto of a predetermined type which belong to a directly lower-order or a directly higher-order hierarchical level; and said evaluation device further-processing the output signals of hierarchically lower-order evaluation devices as input signals and passing output signals on to hierarchically higher-order evaluation devices.

2. The field device according to claim 1, configured for monitoring a transformer substation or a switching substation.

3. The field device according to claim 1, wherein said evaluation device is one of at least two evaluation devices disposed in one field device, and said at least two evaluation devices are connected to one another via a field-device-internal data transmission network.

4. The field device according to claim 3, wherein the at least two evaluation devices, in each case after activation of the field-device-internal data transmission network, automatically produce a data link with hierarchically directly lower-order and/or directly higher-order evaluation devices of the field device.

5. The field device according to claim 1, which further comprises a connection for an external data transmission network for connection to other, external field devices.

6. The field device according to claim 5, wherein said evaluation device of a given said field device is configured to, after connection to the external data transmission network, automatically produce a data link with all other said evaluation devices connected thereto of other field devices or with all other evaluation devices connected thereto of a predetermined type of the other field devices if the respective said evaluation devices belong to a directly lower-order or a directly higher-order hierarchical level.

7. The field device according to claim 1, wherein:

said evaluation device has a communication device, configured such that, after a connection to an internal or external data transmission network, said evaluation device automatically produces a data link with all other communication devices connected thereto of other evaluation devices or with all other communication devices connected thereto of other evaluation devices of a predetermined type if these communication devices belong to a directly lower-order or a directly higher-order hierarchical level; and said evaluation device has an analysis device, connected to the communication device, and further-processing output signals of analysis devices of hierarchically lower-order evaluation devices as input signals and passing dedicated output signals on to analysis devices of hierarchically higher-order evaluation devices by way of the assigned communication device.

8. The field device according to claim 7, wherein said analysis device includes a trigger filter and a case indication filter connected on an output side of said trigger filter and generating the output signals of said evaluation device, and wherein:

said case indication filter is activated only when said trigger filter has responded; and said evaluation device passes dedicated output signals on to hierarchically higher-order evaluation devices only when said case indication filter has been activated.

9. The field device according to claim 1, wherein said evaluation device includes a trigger filter and a case indication filter connected on an output side of said trigger filter and generating the output signals of said evaluation device, and wherein:

said case indication filter is activated only when said trigger filter has responded; and said evaluation device passes dedicated output signals on to hierarchically higher-order evaluation devices only when said case indication filter has been activated.

10. The field device according to claim 9, wherein at least one of said trigger filter and said case indication filter is supplemented in dynamic fashion.

11. The field device according to claim 1, wherein said evaluation device is configured, during the further-processing of the input signals of hierarchically lower-order evaluation devices, to compress information such that the output signals have a higher information density than the input signals.

12. The field device according to claim 11, wherein information compression takes place by omitting information components of the input signals that do not have any significance or have a subordinate significance for the characterization of the operating state of the electrical engineering installation.

13. The field device according to claim 1, wherein said evaluation device is configured for data links in accordance with the standard IEC61850.

14. The field device according to claim 13, wherein said evaluation device is configured to use instantaneous states stored in the object directory of the IEC61850 standard as input signals.

15. The field device according to claim 14, wherein said evaluation device is configured to compare the instantaneous states with state masks that are stored in the field device in a manner which is specific to the field devices or independent of the field devices.

16. The field device according to claim 1, wherein the evaluation device is configured to evaluate output signals of a hierarchically lower-order evaluation device with respect to an assignment of the lower-order evaluation device in terms of circuitry within the electrical engineering installation.

17. The field device according to claim 16, wherein said evaluation device is configured to use installation topology data, which are stored in accordance with the IEC61850 standard, of the electrical engineering installation for the assignment of the lower-order evaluation device in terms of circuitry.

18. An electrical engineering installation, comprising at least two field devices according to claim 1 connectible to one another through a data transmission network, wherein, after connection to the data transmission network, said field devices automatically produce a data link with all other field devices connected thereto belonging to a directly lower-order or a directly higher-order hierarchical level and further-process output signals of hierarchically lower-order field devices as input signals and pass dedicated output signals on to hierarchically higher-order field devices.

* * * * *